Nov. 18, 1969  YOSHITAKA SAKAI  3,478,610
STEPLESS TRANSMISSION USING ELASTIC ROLLING MECHANISM
Filed April 2, 1968  2 Sheets-Sheet 1

INVENTOR
Yoshitaka Sakai
BY Jocies and Greenside
his ATTORNEYS

United States Patent Office 3,478,610
Patented Nov. 18, 1969

3,478,610
STEPLESS TRANSMISSION USING ELASTIC
ROLLING MECHANISM
Yoshitaka Sakai, Nagoya-shi, Japan, assignor to Sakai
Manufacturing Co., Ltd., Nagoya-shi, Japan, a corporation of Japan
Filed Apr. 2, 1968, Ser. No. 718,168
Claims priority, application Japan, Aug. 3, 1967,
42/49,910
Int. Cl. F16h 55/56
U.S. Cl. 74—230.17        1 Claim

ABSTRACT OF THE DISCLOSURE

A stepless transmission of the type having a fixed conical plate member and an axially movable idle conical plate member mounted on each of the driving shaft and the driven shaft in confronting relation for engagement with a drive transmission belt, in which said idle conical plate member is keyed to said drive shaft or driven shaft by means of a coil spring disposed in a cylindrical cavity formed by a semicylindrical axial groove formed in the peripheral wall of said shaft and a corresponding semicylindrical groove formed in the peripheral wall of the axial bore in the boss of said idle conical plate member so that said idle conical plate member may be movable axially but not rotatable relative to said shaft, and between said idle conical plate member and said shaft is disposed an annular coil spring in a radially compressed state on each side of said key so as to elastically support said idle conical plate member on said shaft, said annular coil spring being rollable on said shaft to provide for axial displacement of said idle conical plate member on said shaft.

BACKGROUND OF THE INVENTION

Field of the invention

The present invention relates to a transmission of the type in which each rotary shaft has mounted thereon a fixed conical plate member and an idle conical plate member movable axially of said rotary shaft in confronting relation to said fixed conical plate member. More particularly, the present invention relates to a stepless transmission of the type described above in which use is made of an elastic rolling mechanism for transmission of the drive from a driving source between said rotary shaft and said idle conical plate member and for smooth displacement of said idle conical plate member on said rotary shaft axially thereof.

Description of the prior art

In a conventional transmission of the type described, an axially movable pulley is axially slidably keyed to a rotary shaft by such means as of a spline or a feather key and the drive from a driving source is transmitted therebetween by way of a side wall of said spline or feather key. However, such construction of the prior art transmission is defective in that rattle occurs between the grooved member and the shaft member or, on the contrary, the clearance therebetween is reduced to none rendering the grooved member incapable of sliding on the shaft member, due to the inconsistent thermal expansion caused by a temperature difference or material difference between the shaft and the key, presenting a cause of malfunction. Furthermore, according to the prior art construction in which the driving force is directly transmitted from a rigid member to another rigid member in contact therewith, the contact surfaces of the shaft and the groove, or a bearing used, tend to undergo an excessive wear or dents, or binding tends to occur therebetween. Because in the operation of a transmission in general, vibration occurs at many places interior of the transmission and, in the case of a stepless transmission using a belt, in particular, an intensive vibration of short frequency is caused by the belt driven in the transmission. Still further, the conventional transmission has the drawback that the surfaces of the key groove or the key itself tends to be broken upon being subject to a sharp load.

SUMMARY OF THE INVENTION

It is, therefore, the object of the present invention to provide a novel stepless transmission of the type in which the rotary shafts, i.e. the driving shaft and the driven shaft, each have mounted thereon a fixed conical plate member and an idling conical plate member movable axially of said shaft in confronting relation to said fixed conical plate member, which stepless transmission is entirely free from the drawbacks of the conventional type as set forth above, and which is characterized by a semicylindrical axial groove or grooves of a predetermined length formed in the peripheral wall of each of the driving and driven shafts, a corresponding semicylindrical groove or grooves formed in the peripheral wall of the boss of the idling conical plate member, a key consisting of a coil spring and disposed in a cylindrical cavity formed by the semicylindrical groove in said shaft and the corresponding semicylindrical groove in the boss of said idle conical plate member so as to prevent relative rotation between said shaft and said idle conical plate member peripherally of said shaft, said key being axially immovable relative to the boss of said idle conical plate member, and an annular coil spring axially rollably disposed in the annular space on each side of said key defined by the peripheral wall of the axial bore in the boss of said idle conical plate member and the peripheral wall of said shaft in a radially compressed state for elastically supporting and providing for smooth axial displacement of said idle conical plate member on said shaft.

BRIEF DESCRIPTION OF THE DRAWINGS

The present invention will now be described in further detail by way of an embodiment thereof illustrated in the accompanying drawings, in which.

DESCRIPTION OF THE PREFERRED EMBODIMENT

Figure 1:
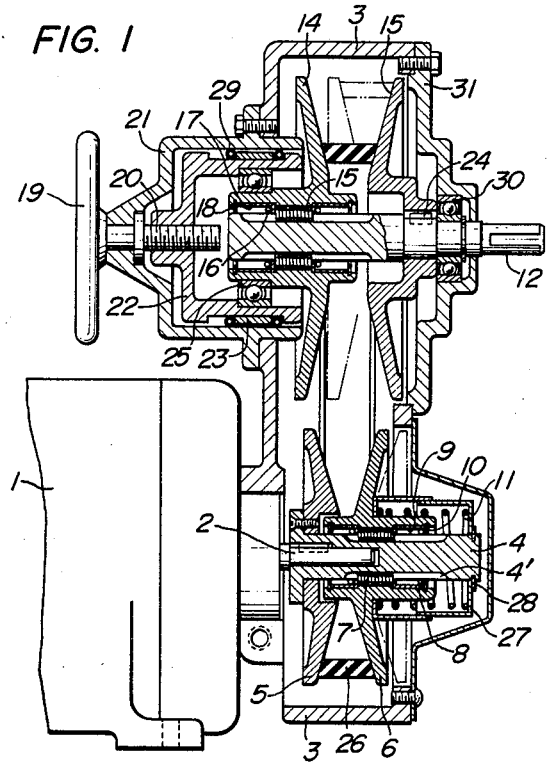
FIGURE 1 is a vertical cross section of the stepless transmission according to the present invention.
Figure 4:
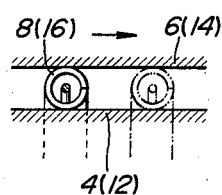
FIGURE 4 is a vertical cross section, in enlargement, illustrating the axial movement of the annular coil spring shown in FIGURE 3.
Figure 5:
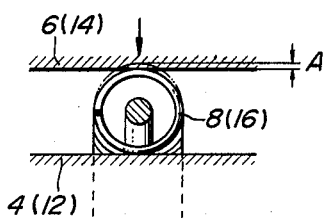
FIGURE 5 is a vertical cross section, in enlargement, showing the annular coil spring mounted between the rotary shaft and the idle conical plate member in a radially compressed state.
Figure 2:
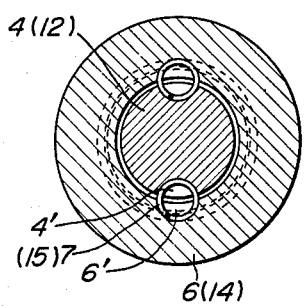
FIGURE 2 is a transverse cross section, in enlargement, of an idle conical plate member mounted on a rotary shaft.
Figure 3:
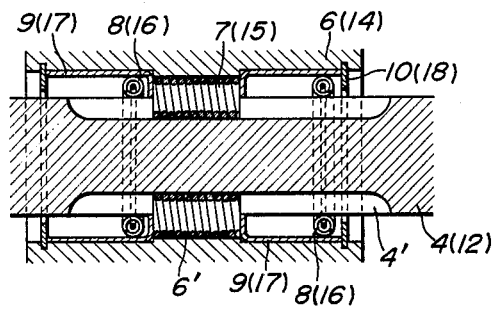
FIGURE 3 is a vertical cross section, in enlargement, illustrating the manner in which the idle conical plate member is mounted on the rotary shaft.
Figure 6:
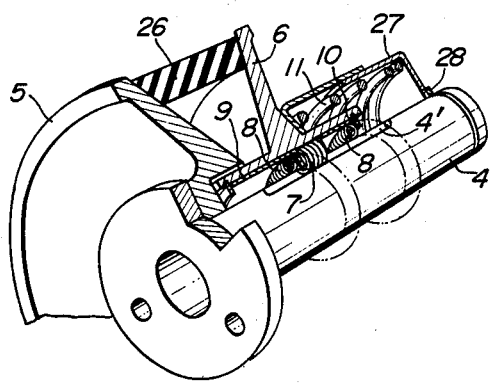
FIGURE 6 is a fragmentary perspective view, partly in section, showing the critical portion on the driving side of the transmission.

Referring to FIG. 1, a motor 1 has a casing 3 fixedly mounted on the boss thereof and a transmission driving shaft 4 is fitted on the motor shaft 2. The driving shaft 4 is formed at one end thereof with a flange, to which a fixed conical plate member 5 is secured by means of bolts. An idle conical plate member 6 is mounted on the driving shaft 4 in confronting relation to the fixed conical plate member 5 in such a manner that it is movable axially but is prevented from rotation relative to the driving shaft 4 by a key 7 consisting of a coil spring. Namely, a semicylindrical axial groove or grooves 4 each of a predetermined length are formed in the central portion of the peripheral wall of the driving shaft 4, while a corresponding semicylindrical axial groove or grooves 6' are formed in the central portion of the peripheral wall of the axial bore in the boss of the idle conical plate member 6. The idle conical plate member 6 is mounted on the driving shaft 4, with the coil spring 7 disposed in the cylindrical cavity formed by the semicylindrical groove 4' in the driving shaft 4 and the corresponding semicylindrical groove 6' in the boss of the idle conical plate member 6, as best shown in FIG. 2, whereby the idle conical plate member 6 is movable axially but not rotatable relative to the driving shaft 4. In order to prevent the axial displacement of the coil spring 7 with respect to the idle conical plate member 6, cylindrical members 9, made of steel, are fitted in the axial bore in the boss of the idle conical plate member 6 from both ends thereof so as to clamp the coil spring 7 therebetween. In the annular space defined by the inner surface of each cylindrical member 9 and the peripheral surface of the driving shaft 4 is disposed an annular coil spring 8 under a suitable radial compressive force A in a manner shown in FIG. 5. Thus, it will be understood that the idle conical plate member 6 is elastically supported by said annular coil springs 8 and these annular coil springs make a rolling motion when the idle conical plate 6 is moved axially on the driving shaft 4. Snap rings 10 are provided in the opposite ends of the axial bore in the boss of the idle conical plate member 6 to prevent the axial displacement of the respective cylindrical member 9. The idle conical plate member 6 is biased towards the fixed conical plate member 5 by a spring 11. The spring 11 is housed in a spring box 27 which is mounted on the free end of the driving shaft 4 and held in position by a snap ring 28.

On the other hand, a driven shaft 12 which is to be driven by the driving shaft 4 by means of a belt 26, has one end thereof journalled in a bearing 30 which is provided in a bracket 31 fixed to the aforesaid casing 3 by means of bolts. The other end of the driven shaft 12 is supported by a bracket 21 fixed to the casing 3, through annular coil springs 29, a slide case 22, a bearing 25 and an idle conical plate member 14.

A fixed conical plate 13 is fixed on the driven shaft 12 by means of a key 24 in confronting relation to the idle conical plate member 14. The idle conical plate member 14 is mounted on the driven shaft 12 in the same manner as the idle conical plate member 7 on the driving shaft 4 described previously. Namely, the driven shaft 12 has a semicylindrical axial groove or grooves formed in the central portion of the peripheral wall thereof, while a corresponding semicylindrical axial groove or grooves are formed in the central portion of the peripheral wall of the axial bore in the boss of the idle conical plate member 14, and said idle conical plate member 14 is mounted on said driven shaft 12 with a key 15, consisting of a coil spring, disposed in the cylindrical cavity formed by the semicylindrical groove in said driven shaft and the corresponding semicylindrical groove in the boss of said idle conical plate member, as best shown in FIG. 2, whereby the idle conical plate member 14 is slidable axially but not rotatable relative to the driven shaft 12. The coil spring 15 constituting the key is secured in position with respect to the boss of the idle conical plate member 14 by cylindrical members 17 fitted in the axial bore in the boss of the idle conical plate member and secured by snap rings 18 respectively. Between each of the cylindrical members 17 and the driven shaft 12 is disposed an annular coil spring 16 under a suitable radial compressive force A and this annular coil spring makes a rolling motion when the idle conical plate member is displaced axially on the driven shaft 12.

The slide case 22 supporting at its boss the idle conical plate member 14 is mounted in the bracket 21 through the annular coil springs 29. A handle 19 is integrally connected to a screw rod 20 which is extending through the bracket 21 and has the threaded portion thereof screw through the slide case 22. Thus, it will be seen that, upon rotating the handle 19, the slide case 22 is moved forwardly or backwardly causing the idle conical plate member 14 to move towards or away from the fixed conical plate member 13, and thereby the rate of rotation of the driven shaft 12 is varied. The slide case 22 is movable axially of the driven shaft 12 by the rolling motion of the annular coil springs 29 but is prevented from rotating by said annular coil springs. The annular coil springs 29 are spaced from each other by an annulus 23. The screw rod 20 connected to the handle 19 is rotatably but not axially movably supported by the bracket 21. The annular coil springs 16 and 29 are disposed under a suitable radial compressive force corresponding to the load to be imposed on the driven shaft 12.

In operating the stepless transmission of this invention constructed as described above, when the driven shaft 12 is desired to be rotated at a higher rate, the handle 19 is rotated so as to move the idle conical plate member 14 away from the fixed conical plate member 13 to the position indicated by the solid line in FIG. 1, whereby the end of the V-belt 26 on the driven shaft side gets closer to the driven shaft 12 and then accordingly the idle conical plate member 6 on the driving shaft 4 is allowed to move towards the fixed conical plate member 5 under the biasing force of the spring 11, displacing the other end of the V-belt on the driving shaft side away from the driving shaft 4. Thus, the driven shaft 12 is rotated at a higher rate. On the contrary, when the driven shaft 12 is desired to be driven at a lower rate, the handle 19 is rotated in an opposite direction to move the idle conical plate member 14 towards tre fixed conical plate member 13 as indicated by the chain line in FIG. 1, whereupon the end of the V-belt 26 on the driven shaft side is made larger in curvature and accordingly the fixed and idle conical plate members on the driving shaft are more spaced apart allowing the end of the V-belt 26 on the driving shaft side to have a reduced curvature. Thus, it is possible to change the rate of rotation of the driven shaft 12 to a lower rate.

Since, as described above, the elastic coil spring is disposed between the rotary shaft and the idle conical plate member, mounted thereon, as a key to transmit the drive of the motor and further the rollable annular coil springs are disposed therebetween in a radially compressed state to provide for axial displacement of the idle conical plate member, the stepless transmission according to the present invention is advantageous in that a difference in dimensional change between the operating parts due to the inconsistent thermal expansion can be taken care of by the elasticity of said coil spring constituting the key and the annular coil springs and, in addition, an intensive vibration or a sharp load imposed on the driven shaft during the operation of the transmission of the present invention can be sufficiently absorbed by said springs. Therefore, the transmission of the instant invention is entirely free from the drawbacks of the conventional stepless transmission as set forth earlier, and a smooth and quiet rotation of the rotary shafts can be obtained as a result of the vibration of short frequency being absorbed by the springs. Another advantage of the inventive transmission is that, because of the rolling motion of the annular coil springs mounted on the rotary shafts and the slide case, the transmission can be operated with minimum friction and therefore malfunction of the transmission caused by binding, etc. can be eliminated. The use of the annular coil springs also enables the construction of the transmission to be simplified, renders the transmission operable semipermanently without necessitating the use of a lubricating oil and a failure in the internal mechanism. Still another advantage of the inventive transmission is that the axial displacement of the idle conical plate members and the slide case can be effected with only a small force due to the rolling motion of the annular coil springs even though said annular coil springs are mounted under a radial compressive force, and furthermore, since the compressive force exerted on the annular coil springs is so selected as to take care of a possible dimensional change caused by slight wear of the rotary shafts or the inner walls of the respective grooves by the radial expansion of said springs, rattle can be eliminated semi-permanently.

I claim:

1. A stepless transmission of the type in which the rotary shafts respectively have mounted thereon a fixed conical plate member and a cooperating idle conical plate member movable axially of said shaft in confronting relation to said fixed conical plate member, said stepless transmission being characterized by a semicylindrical axial groove or grooves of a predetermined length formed in the peripheral wall of said rotary shaft, a corresponding semicylindrical axial groove or grooves formed in the peripheral wall of the axial bore in the boss of said idle conical plate member, a key consisting of a coil spring and disposed in the cylindrical cavity formed by the semicylindrical groove in said rotary shaft and the corresponding semicylindrical groove in the boss of said idle conical member so as to prevent relative rotation between said rotary shaft and said idle conical plate member peripherally of said shaft, and an annular coil spring rollably disposed in the annular space on each side of said key defined by the peripheral wall of the rotary shaft and the peripheral wall of the axial bore in the boss of the idle conical plate member in a radially compressed state so as to elastically support said idle conical plate member on said rotary shaft.

References Cited

UNITED STATES PATENTS

| | | |
|---|---|---|
| 1,234,213 | 7/1917 | Reno. |
| 2,658,401 | 11/1953 | Knudsen _____ 74—230.17 |
| 2,899,809 | 8/1959 | Battaline _____ 64—15 |
| 3,237,471 | 3/1966 | Wunsch _____ 74—230.17 |

FRED C. MATTERN, JR., Primary Examiner

JAMES A. WONG, Assistant Examiner

U.S. Cl. X.R.

64—15, 27; 287—52.05, 53